Patented Mar. 31, 1936

2,035,751

UNITED STATES PATENT OFFICE 2,035,751

PRODUCTION OF QUINALDINES

Max Albert Kunz, Mannheim, and Gerd Kochendoerfer and Karl Koeberle, Ludwigshafen-on-the-Rhine, Germany, assignors to General Aniline Works, Inc., New York, N. Y., a corporation of Delaware No Drawing. Application July 14, 1932, Serial No. 622,570. In Germany July 17, 1931

8 Claims. (Cl. 260—38)

The present invention relates to an improved process of producing quinaldines.

We have found that quanaldines are obtained in very good yields by causing crotonaldehyde to act at elevated temperatures on primary aromatic amines or their N-substitution products which are capable of reacting as primary aromatic amines under the reaction conditions, in sulphuric acid in the presence of mild, water-soluble, acid oxidizing agents. In the simplest case, namely, when aniline is used as initial material, the reaction proceeds according to the following equation which is given as a typical example:

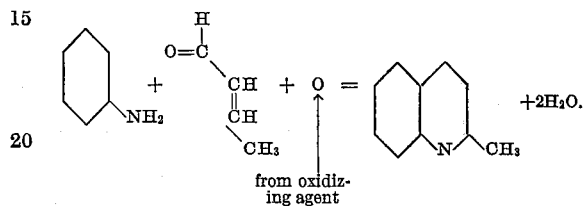

Instead of crotonaldehyde, other compounds may be employed which are capable of forming crotonaldehyde under the reaction conditions, as for example aldol, acetaldehyde and paraldehyde. Suitable aromatic amines are, for example, aniline, the toluidines, chlor- and nitro-anilines, anisidine, benzidine and its derivatives such as dianisidine, naphthylamines, naphthylamine sulphonic acids, aminoacridines and their salts. As N-substitution products of aromatic amines which are capable of reacting as amines under the reaction conditions may be mentioned acylated amines and azomethines. Suitable mild, water-soluble, acid oxidizing agents are such as do not react with the amines under the working conditions, for example nitrobenzene sulphonic acid, nitrotoluene sulphonic acid and arsenic acid.

The reaction conditions may be varied within wide limits. Thus either concentrated or diluted, as for example 20 per cent, sulphuric acid may be employed. The reaction may be carried out at moderately elevated temperatures, as for example at 90° C., but good yields of quinaldines are still obtained even at temperatures of 160° C. and more. Especially favorable working conditions for the conversion of a large number of the amines with crotonaldehyde are sulphuric acid concentrations of from 70 to 90 per cent and temperatures of from 110° to 140° C. In many cases it may be advantageous to add inorganic salts, as for example ammonium vanadate and zinc sulphate.

The following examples will further illustrate the nature of this invention but the invention is not restricted to these examples. The parts are by weight.

Example 1

350 parts of nitrobenzene and 900 parts of 28 per cent oleum are heated on a waterbath until nitrobenzene is no longer detectable. The resulting sulphuric acid solution of nitrobenzene sulphonic acid is diluted with 200 parts of water and then 400 parts of aniline are introduced into the warm diluted solution in such a manner that the temperature after all has been added, is about 125° C., 360 parts of crotonaldehyde are then allowed to flow in at such a rate that the temperature of the mixture remains at about 130° C. When the crotonaldehyde has all been added the mixture is kept at the same temperature for 1 to 2 hours. About 100 parts of water are then poured in and the mixture is allowed to cool. The hydroxymetanilic acid which separates in considerable amount is filtered off by suction and a sufficient amount of caustic soda solution is added to the filtrate to neutralize the bulk of the excess of sulphuric acid. Then, while cooling, so much sodium nitrite solution is allowed to flow in that free nitrous acid is detectable, the deposited resin is filtered off and the filtrate rendered alkaline. The oily crude quinaldine which separates is taken up in ether and the etheral solution is dried with potash. After expelling the ether the crude quinaldine is obtained as a dark oil, wihch may be purified by distillation under a pressure of 18 millimeters (mercury gauge) leaving but a very slight residue. Pure quinaldine is obtained in a yield of 440 parts.

Example 2

70 parts of nitrobenzene are sulphonated by warming with 180 parts of 28 per cent oleum. After diluting the sulphonation mixture with 40 parts of water, 94 parts of ortho-toluidine are added thereto. At a temperature of 130° C., 70 parts of crotonaldehyde are allowed to flow in at such a rate that the temperature at first remains between 130° and 140° C. and then falls to about 125° C. towards the end of the reaction. The mixture is boiled for some hours, 200 parts of water are stirred in, the whole allowed to cool and the hydroxymetanilic acid which separates in a crystalline form is filtered off by suction. The further working up of the filtrate may be carried out as described in Example 1. The resulting ortho-toluquinaldine corresponding to the formula:

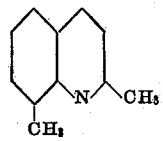

is a water-clear oil. The para-toluquinaldine obtained in the same way from para-toluidine is crystalline.

Example 3

A sulphuric acid solution of nitrobenzene sulphonic acid prepared from 350 parts of nitrobenzene and 900 parts of 28 per cent oleum is diluted with 225 parts of water. 400 parts of ortho-chloraniline are stirred in, 5 parts of zinc sulphate are added and then 260 parts of crotonaldehyde are allowed to drop into the mixture which is at a temperature of about 130° C. at such a rate that the temperature is kept between 130° and 140° C. by the reaction heat evolved without any external supply of heat. When all the crotonaldehyde has been added the temperature is kept at 130° C. for about an hour, 50 parts of water and about 420 parts of caustic soda solution of 40° Baumé strength are stirred in and the mixture allowed to cool gradually while stirring. The resulting crystal pulp is freed from liquid by filtration and the product stirred with from about 1000 to 1500 parts of water. The hydroxymetanilic acid, which remains undissolved, is filtered off and the filtrate rendered alkaline. The 8-chlorquinaldine which separates first as an oily liquid soon solidifies and, for example after distillation in vacuo, is obtained in the form of a colorless crystalline mass.

Other halogenated quinaldines are obtained in a similar manner, as for example 6-chlorquinaldine from para-chloraniline.

Example 4

A sulphuric acid solution of nitrobenzene sulphonic acid prepared from 450 parts of nitrobenzene and 1125 parts of 28 per cent oleum is diluted with 325 parts of water and, after the addition of 25 parts of a 1 per cent ammonium vanadate solution, 550 parts of beta-naphthylamine are added at from 110° to 120° C. 350 parts of crotonaldehyde are gradually stirred in at 130° C. so that the temperature remains between about 140° and 150° C. The mixture is then stirred for a further hour at 130° C. and 800 parts of water are added to the reaction mixture which is still hot. The whole is allowed to cool gradually while stirring, the 5.6-benzoquinaldine sulphate which separates in a crystalline form is filtered off by suction and washed with 25 per cent sulphuric acid. The sulphate is dissolved in hot water, the solution filtered and rendered alkaline, if desired after boiling with animal charcoal, whereby 5.6-benzoquinaldine is precipitated. It may be purified by distillation in vacuo.

Example 5

200 parts of ortho-chloraniline are introduced into a mixture of 250 parts of concentrated sulphuric acid and 400 parts of about 78 per cent arsenic acid, and then 130 parts of crotonaldehyde are allowed to flow while stirring well into the mixture which is at a temperature of about 120° C., whereby the temperature rises slightly at the commencement. The mixture is then kept for from 1 to 2 hours at the boiling point (124° C.), poured on to ice, treated with sodium nitrite solution until free nitrous acid can be detected, filtered and the filtrate rendered alkaline. The reaction product thus separated is filtered off by suction and may be distilled, if desired, in vacuo. The purification of the crude product obtained by adding alkali to the reaction mixture may also be effected by way of the double salts, as for example the zinc double salt. It is identical with the 8-chlorquinaldine obtained according to Example 3.

Example 6

110 parts of para-phenylenediamine are introduced into a sulphuric acid solution of nitrobenzene sulphonic acid prepared by warming 210 parts of nitrobenzene with 540 parts of 28 per cent oleum and subsequent dilution with 100 parts of water. The mixture is then heated to about 140° C. 160 parts of crotonaldehyde are then dropped in. After the reaction is complete, the reaction mixture is poured into water and rendered alkaline by the addition of aqueous ammonia. The oil separating first solidifies after some time to a crystalline pulp which is filtered off and pressed free from liquid. The filter cake is then dissolved in hydrochloric acid and zinc chloride is added after warming the solution. The double salt separating on cooling is filtered off, washed with a small amount of dilute hydrochloric acid and decomposed by means of aqueous ammonia. The dimethyl pseudo-phenanthroline thus obtained corresponds to the formula:

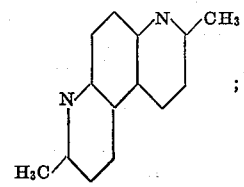

it may be purified, if desired, by distillation in vacuo.

Other diamines may be converted into the corresponding quinaldines in an analogous manner. Thus from benzidine 2.2'-dimethyl-6.6'-diquinolyl which corresponds to the formula:

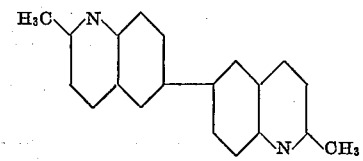

and which crystallizes from ethyl alcohol in beautiful crystals is obtained.

Example 7

250 parts of acetanilide are stirred into a solution of nitrobenzene sulphonic acid prepared as described in the foregoing example. 170 parts of crotonaldehyde are then slowly run into the mixture, kept at between 130° and 140° C., while stirring. After the addition, the mixture is kept for some time at about 130° C. and worked up as described in Example 1. The reaction product is quinaldine which may also be obtained while employing the equivalent amount of benzylideneaniline instead of acetanilide.

Example 8

70 parts of nitrobenzene are sulphonated by warming with 200 parts of 23 per cent oleum, and 40 parts of water and 40 parts of 3.6-diaminoacridine are added. 35 parts of crotonaldehyde are then added to the mixture, kept at between 125° and 130° C., which, after completion of the reaction, is poured into water. The product which first separates as a viscous mass, but soon solidifies, is filtered off and recrystallized from water. The crystalline salt thus obtained is decomposed in the usual manner by means of ammonia. The dimethyldipyridinoacridine thus prepared corresponds to the formula:

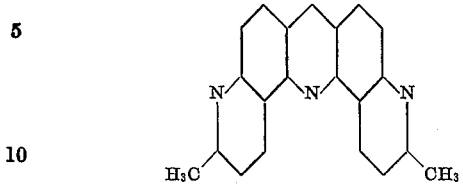

it crystallizes from organic solvents in the form of fine colorless needles.

Example 9

350 parts of nitrobenzene are sulphonated by warming with 900 parts of 28 per cent oleum, and 250 parts of water and 400 parts of para-amino benzoic acid are added. 250 parts of crotonaldehyde are then run into the mixture, kept at between 130° and 140° C. After completion of the reaction, the mixture is diluted with 300 parts of water and allowed to cool slowly. The sulphonate of quinaldine-paracarboxylic acid separated in crystalline form is filtered off, washed with a small amount of cold dilute sulphuric acid and dissolved in aqueous ammonia. The solution is boiled up with animal charcoal, filtered and quinaldine-para-carboxylic acid corresponding to the formula:

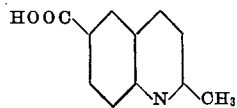

is precipitated by the addition of acetic acid to the filtrate.

Example 10

300 parts of nitrobenzene are warmed with 100 parts of 23 per cent oleum until on dilution of a sample with water nitrobenzene cannot any longer be detected. The solution is then diluted with 400 parts of water, whereupon 450 parts of 1-naphthylamino-6-sulphonic acid are introduced while stirring, and then 170 parts of crotonaldehyde are dropped in at about 110° C. The reaction mixture is kept at the said temperature for some time and then 100 parts of water are run in while stirring. After cooling, the 7.8-benzoquinaldine-Bz2-sulfonic acid corresponding to the formula:

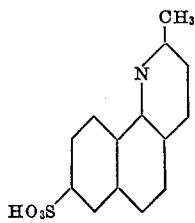

separated in crystalline form in an excellent yield is filtered off and washed first with dilute sulphuric acid and then with water and dried. The said acid may be further purified by way of its sodium salt.

In an analogous manner other benzoquinaldine sulphonic acids may be produced. Thus from aminonaphtholsulphonic acids the corresponding hydroxybenzoquinaldine sulphonic acids are obtained.

Example 11

A sulphuric acid solution of nitrobenzene sulphonic acid prepared from 350 parts of nitrobenzene and 900 parts of 28 per cent oleum is diluted with 350 parts of water, whereupon 330 parts of ortho-aminophenol are introduced and then 250 parts of crotonaldehyde are dropped in at between about 110° and 115° C. The reaction mixture is then poured on to ice, the acidity thereof reduced by the addition of sodium carbonate and the precipitated reaction product treated with steam after the addition of an excess of sodium carbonate. The 8-hydroxyquinaldine separating in the form of snow-white crystals in the condenser is filtered off and dried and may further be purified by distillation in vacuo.

In the appended claims the term "a nitrobenzene sulfonic acid" is to be understood as embracing the nitroaryl sulfonic acids of the benzene series.

What we claim is:

1. A process of producing a quinaldine, which comprises heating a primary aromatic amine containing from 1 to 3 nuclei in the molecule, with a compound of the group consisting of crotonaldehyde and compounds capable of forming crotonaldehyde under the reaction conditions, in sulfuric acid in the presence of a nitrobenzene sulfonic acid.

2. A process of producing a quinaldine, which comprises heating a primary aromatic amine containing from 1 to 3 nuclei in the molecule, with crotonaldehyde in sulfuric acid in the presence of a nitrobenzene sulfonic acid.

3. A process of producing a quinaldine, which comprises heating a primary aromatic amine containing from 1 to 3 nuclei in the molecule, with crotonaldehyde in sulfuric acid of between 70 and 90 per cent strength in the presence of a nitrobenzene sulfonic acid.

4. A process of producing a quinaldine, which comprises heating a primary aromatic amine containing from 1 to 3 nuclei in the molecule, with crotonaldehyde in sulfuric acid of between 70 and 90 per cent strength in the presence of a nitrobenzene sulfonic acid at between 110° and 140° C.

5. A process of producing quinaldines, which comprises heating a primary aromatic amine containing from 1 to 3 nuclei in the molecule, with a compound of the group consisting of crotonaldehyde and compounds capable of forming crotonaldehyde under the reaction conditions, in sulfuric acid in the presence of a nitrobenzene sulfonic acid and ammonium vanadate.

6. A process of producing quinaldine, which comprises heating aniline with crotonaldehyde in sulphuric acid of between 70 and 90 per cent strength in the presence of nitrobenzene sulphonic acid at between 110° and 140° C.

7. A process of producing a chlorquinaldine, which comprises heating a chloraniline with crotonaldehyde in sulphuric acid of between 70 and 90 per cent strength in the presence of nitrobenzene sulphonic acid at between 110° and 140° C.

8. A process of producing benzoquinaldine, which comprises heating a naphthylamine with crotonaldehyde in sulphuric acid of between 70 and 90 per cent strength in the presence of nitrobenzene sulphonic acid at between 110° and 140° C.

MAX ALBERT KUNZ.
GERD KOCHENDOERFER.
KARL KOEBERLE.